United States Patent
Chen et al.

(10) Patent No.: US 12,275,649 B1
(45) Date of Patent: Apr. 15, 2025

(54) LITHIUM MANGANESE IRON PHOSPHATE SUBSTRATE, CATHODE MATERIAL, PREPARATION METHOD, AND LITHIUM BATTERY

(71) Applicant: Hunan Yuneng new energy battery materials Co., LTD., Xiangtan (CN)

(72) Inventors: Tao Chen, Xiangtan (CN); Fenglei Yu, Xiangtan (CN); Tao Lin, Xiangtan (CN); Jiangtao Cheng, Xiangtan (CN)

(73) Assignee: Hunan Yuneng new energy battery materials Co., LTD., Hunan (CN)

( * ) Notice: Subject to any disclaimer, the term of this patent is extended or adjusted under 35 U.S.C. 154(b) by 0 days.

(21) Appl. No.: 18/967,354

(22) Filed: Dec. 3, 2024

(30) Foreign Application Priority Data

Feb. 7, 2024 (CN) .......................... 202410174804.7

(51) Int. Cl.
- C01B 25/45 (2006.01)
- B82Y 30/00 (2011.01)
- B82Y 40/00 (2011.01)
- C01G 49/00 (2006.01)
- H01M 4/36 (2006.01)
- H01M 4/48 (2010.01)

(Continued)

(52) U.S. Cl.
CPC ...... C01G 49/009 (2013.01); H01M 10/0525 (2013.01); *C01P 2004/03* (2013.01); *C01P 2006/40* (2013.01)

(58) Field of Classification Search
CPC .............. C01G 49/009; H01M 10/0525; C01P 2004/03; C01P 2006/40
See application file for complete search history.

(56) References Cited

U.S. PATENT DOCUMENTS

2016/0013474 A1* 1/2016 Liu .................. B82Y 30/00
429/224

FOREIGN PATENT DOCUMENTS

| CN | 116632455 A | * | 8/2023 |
| KR | 20190049327 A | * | 5/2019 |

(Continued)

OTHER PUBLICATIONS

Translated CN-116632455-A (Year: 2023).*

(Continued)

*Primary Examiner* — Christopher P Domone
*Assistant Examiner* — Sarah A Applegate
(74) *Attorney, Agent, or Firm* — Valet Patent Service Limited

(57) ABSTRACT

A lithium manganese iron phosphate substrate, cathode material, and their preparation method, as well as a lithium battery, belonging to the field of lithium-ion battery technology. The preparation of the lithium manganese iron phosphate substrate comprises the following steps: dissolving soluble ferrous salt, soluble manganese salt, phosphoric acid, and lithium hydroxide in deionized water to react, obtaining Material A; filtering Material A, taking the filter cake and drying it to obtain Material B; Heat treating Material B in an inert gas atmosphere to obtain the lithium manganese iron phosphate substrate. By coating the surface of the carbon-free nano lithium manganese iron phosphate substrate with metal oxides or metal salts and carbon, the coating layer formed on the surface of the composite lithium manganese iron phosphate material effectively prevents the reaction between the lithium battery and the electrolyte.

8 Claims, 1 Drawing Sheet

(51) Int. Cl.
*H01M 4/58* (2010.01)
*H01M 4/583* (2010.01)
*H01M 4/62* (2006.01)
*H01M 10/0525* (2010.01)

(56) References Cited

FOREIGN PATENT DOCUMENTS

| WO | WO-2023184368 A1 | * | 10/2023 | ............. C01B 25/45 |
| WO | WO-2023206911 A1 | * | 11/2023 | ........ H01M 10/0525 |

OTHER PUBLICATIONS

Translated WO-2023184368-A1 (Year: 2023).*
Translated KR 20190049327 A (Year: 2019).*
Translated WO-2023206911-A1 (Year: 2023).*

* cited by examiner

LITHIUM MANGANESE IRON PHOSPHATE SUBSTRATE, CATHODE MATERIAL, PREPARATION METHOD, AND LITHIUM BATTERY

TECHNICAL FIELD

The present application relates to the technical field of lithium-ion batteries, specifically to lithium manganese iron phosphate substrates, cathode materials, their preparation methods, and lithium batteries.

BACKGROUND

Lithium manganese iron phosphate (abbreviated as LMFP) is a product combining lithium iron phosphate (abbreviated as LFP) and lithium manganese phosphate (LMP). Since lithium manganese iron phosphate combines the advantages of lithium manganese phosphate and lithium iron phosphate, it has high safety and stability, and its energy density is higher than that of lithium iron phosphate, it is also known as the 'upgraded version of lithium iron phosphate.'

In the prior art, regarding the preparation method of lithium manganese iron phosphate, such as in the patent document with application number CN202210761079.4, the lithium manganese iron phosphate material is mixed with an organic reagent to obtain a slurry, which is then coated on the surface of a substrate to obtain a wet film, and after heat treatment, a carbon-coated lithium manganese iron phosphate film is obtained; Using carbon-coated lithium manganese iron phosphate film as the substrate, the electron beam evaporation method is employed to grow $CuInS_2$—$Ge_2Sb_2Te_5$ composite film on the substrate, obtaining the precursor; The precursor is annealed to obtain the modified lithium manganese iron phosphate cathode material, with a $CuInS_2$—$Ge_2Sb_2Tes$ film grown on the surface of the modified lithium manganese iron phosphate cathode material. However, using the electron beam evaporation method to attach the target coating material to lithium manganese iron phosphate is currently quite expensive, resulting in relatively high preparation costs, making it unsuitable for large-scale production. As described in the patent document with application number CN202011026080.X, the core material is prepared for use, which comprises $LiMn_yFe_{1-y}PO_4$; The core material is mixed with the barrier material and subjected to solid phase sintering to obtain the intermediate; The intermediate, lithium manganese iron phosphate, and lithium source are mixed and subjected to solid phase sintering to obtain the lithium manganese iron phosphate composite material. The lithium manganese iron phosphate composite material comprises a core formed by the core material and a coating layer covering the core. The coating layer comprises a barrier material layer formed by the barrier material sequentially arranged on the surface of the core and a lithium manganese iron phosphate layer. The material of the lithium manganese iron phosphate layer comprises $LiMn_yFe_{1-y}PO_4$, where y<x. However, multiple coating layers are applied on the surface of the core, and each coating layer is different. The uniformity and thickness of each coating layer need to be considered. Multiple coatings will amplify the defects of each coating layer, causing greater performance loss. The process is complex, which is not conducive to large-scale production and cost control. For example, the patent document with application number CN202210309750.1 involves the preparation of carbon-coated lithium iron phosphate particles; preparation of carbon-coated lithium manganese iron phosphate particles with different particle sizes; Using carbon-coated lithium iron phosphate particles as the core, according to the order of particle size from small to large of the carbon-coated lithium manganese iron phosphate particles, lithium manganese iron phosphate coating layers are sequentially prepared on the outer surface of the core, forming multiple lithium manganese iron phosphate coating layers, resulting in a single-core multi-shell lithium manganese iron phosphate composite material. Similarly, there are also issues of multilayer coating, complex process flow, which are not conducive to large-scale production and cost control. For example, the patent document with application number CN202110289750.5 describes placing manganese dioxide, phosphoric acid, and water in a container for stirring, adding aniline, and continuing to stir to obtain polyaniline. Weigh the iron source, lithium source, carbon source, and organic additives, and adding them to the polyaniline for grinding and stirring; dry and calcine in an air atmosphere to obtain the precursor. Adding the carbon source again to the precursor, along with a grinding medium, to grind and obtain a grinding slurry; vacuum dry the grinding slurry to obtain the reaction powder. After sintering the reaction powder under a protective atmosphere and cooling to room temperature, crushing and sieving, a polyaniline/carbon-coated lithium manganese iron phosphate cathode material for lithium-ion batteries is obtained. A secondary addition of carbon source is required, which may result in uneven coating and difficulty for the carbon source to penetrate into the fine pores of the secondary particles. For example, the patent document with application number CN202110779077.3 describes dissolving a soluble iron source and phosphate in water, adjusting the pH with an alkaline solution, and then adding an oxidant to carry out an oxidation reaction to obtain an iron (III) phosphate intermediate; Dissolve the manganese source, iron source, and phosphorus source in an aqueous solution separately to prepare the iron manganese phosphate intermediate according to a certain molar ratio; Then mix the iron (III) phosphate intermediate, iron manganese phosphate intermediate with the lithium source, carbon source, and solvent to prepare the nano lithium manganese iron phosphate cathode material. This preparation method has stringent pH requirements and requires additional additives to adjust the pH, making large-scale control relatively difficult. For example, the patent document with application number CN202010625882.6 uses iron powder as a catalyst, adds a gaseous carbon source, and prepares an iron powder/carbon nanotube composite through chemical vapor deposition. This composite is added to a phosphoric acid solution, and potassium permanganate is added simultaneously to react, forming an iron manganese phosphate/carbon nanotube precursor. After grinding and sintering, a lithium manganese iron phosphate/carbon nanotube composite cathode material is obtained. However, the vapor deposition method has stringent conditions and high equipment requirements, making it unsuitable for large-scale production.

Moreover, the lithium manganese iron phosphate prepared by the aforementioned method still has many fatal defects, such as the addition of manganese elements in lithium manganese iron phosphate, and the dissolution of manganese will lead to a shorter cycle life and deteriorate the charge-discharge capacity and lifespan. The low conductivity of lithium manganese iron phosphate and its side reactions with the electrolyte make it difficult for the material's capacity to be fully utilized.

Therefore, how to suppress the manganese dissolution of lithium manganese iron phosphate and improve its electronic/ionic conductivity remains a technical challenge in this field.

SUMMARY

The purpose of this application is to provide a lithium manganese iron phosphate substrate, cathode material, and their preparation methods, as well as a lithium battery, to address the issues of manganese dissolution and low electronic/ionic conductivity of lithium manganese iron phosphate in existing technologies.

The objective of this application can be achieved through the following technical solutions:

A preparation method for a lithium manganese iron phosphate substrate, which comprises the following steps:

A1. dissolving soluble ferrous salt, soluble manganese salt, phosphoric acid, and lithium hydroxide in deionized water to react and obtain Material A;

A2. filtering the Material A, taking filter cake and drying it to obtain Material B;

A3. heat treating the Material B in an inert gas atmosphere to obtain the lithium manganese iron phosphate substrate.

As a further aspect of the present application, the heat treating in step A3 refers to calcining at 200-500° C. for 3-8 hours.

A lithium manganese iron phosphate substrate prepared by the above preparation method, wherein the chemical formula of the lithium manganese iron phosphate substrate is $LiMn_xFe_{1-x}PO_4$, $0.3 \leq x < 0.9$.

As a further aspect of the present application, in $LiMn_xF_{1-x}PO_4$, $0.5 \leq x \leq 0.8$.

As a further aspect of the present application, in $LiMn_xFe_{1-x}PO_4$, $0.6 \leq x \leq 0.7$.

As a further aspect of the present application, there are no particular restrictions on the filtering in step A2, and conventional filtration methods in the field can be used.

As a further aspect of the present application, there are no particular restrictions on the drying method in step A2, and any drying method in the field can be used.

As a further aspect of the present application, the heat treating described in step A3 refers to calcining at 250-450° C. for 4-7 hours.

A preparation method for a cathode material, comprising the following steps:

B1. Placing lithium manganese iron phosphate substrate $LiMn_xFe_{1-x}PO_4$, $0.3 \leq x < 0.9$, obtained above into a dry coating machine, adding coating agent and mixing, then adding carbon source and mixing to obtain mixture C;

B2. calcining the mixture C in a protective atmosphere, crushing it to obtain the cathode material.

As a further aspect of the application, the carbon source comprises a composite carbon source.

As a further aspect of the present application, the preparation of the composite carbon source comprises the following steps:

(1) mixing sulfuric acid aqueous solution and nitric acid aqueous solution, adding carbon nanotubes, performing ultrasonic dispersion, adding deionized water, conducting temperature-controlled stirring, performing suction filtration, taking solid phase and dry it to obtain acidified carbon nanotubes;

wherein the dosage ratio of the sulfuric acid aqueous solution, the nitric acid aqueous solution, the carbon nanotube, and the deionized water is 300-450 mL: 100-150 mL: 0.8-1.2 g: 500 mL;

wherein the mass fraction of sulfuric acid in the sulfuric acid aqueous solution is 98%, and the mass fraction of nitric acid in the nitric acid aqueous solution is 95%;

wherein the ultrasonic dispersion time is 30-40 minutes;

wherein the temperature-controlled stirring refers to constant temperature magnetic stirring at 60° C. for 4-6 hours;

wherein the suction filtration refers to using a 0.22 μm polytetrafluoroethylene membrane for filtration;

wherein the drying refers to drying at 65-70° C. for 4-6 hours;

(2) adding reed pulp and potassium permanganate to the sulfuric acid aqueous solution, stirring, performing a temperature-controlled reaction, centrifugal washing, ultrasonically crushing, separating, taking solid phase to add into deionized water, stirring for 15-30 minutes, and performing homogenization treatment 3-4 times under 300 bar pressure to obtain nanocellulose gel, which is sealed and stored at 4° C. for later use.

wherein the dosage ratio of the sulfuric acid aqueous solution, reed pulp, potassium permanganate, and deionized water is 50-80 mL: 1-2 g: 8-12.8 g: 200 mL; the stirring time is 1-2 h; the mass fraction of sulfuric acid in the sulfuric acid aqueous solution is 55%; the temperature-controlled reaction refers to a reaction at 50° C. for 2-3 h; the centrifugal washing refers to washing until the pH reaches 6-7;

wherein the reed pulp was purchased from Mudanjiang Hengfeng Paper Group Co., Ltd.;

wherein the mass fraction proportions of the main components of the reed pulp are as follows:

| | |
|---|---|
| Moisture | 5.92%; |
| Ash content | 2.39%; |
| Lignin | 7.44%; |
| Cellulose | 75.84%; |

(3) mixing the acidified carbon nanotubes, the nanocellulose gel, and the deionized water, and performing ultrasonic dispersion in an ice-water bath to obtain a carbon-containing mixture solution;

wherein the ratio of the acidified carbon nanotubes, the nanocellulose gel, and the deionized water is 4-7 mg: 2-6 mL: 20-40 mL; the ultrasonic dispersion refers to sonication at an amplitude of 650-700 W for 20-30 minutes;

(4) mixing dimethylformamide, graphene oxide, and diethylenetriamine, performing ultrasonic oscillation for 15-20 minutes, conducting a temperature-controlled reaction, filtering, and drying the solid phase to obtain modified graphene oxide;

wherein the mass ratio of the dimethylformamide, graphene oxide, and diethylenetriamine is 40-60:1.5-3:50-60.

wherein the temperature-controlled reaction refers to stirring at 60° C. for 12-16 hours, wherein the graphene oxide is prepared using the modified Hummers method.

(5) taking the modified graphene oxide and deionized water, mixing and ultrasonically dispersing for 1-1.5 hours, adding the carbon-containing mixture solution, and ultrasonically dispersing for 1-2 hours to obtain a dispersion, adjusting the pH of the dispersion to 1.0-1.5, adding aniline, stirring in a 0-5° C. water bath for 1-2 hours, adding ammonium persulfate aqueous solution, reacting at 0-5° C. for 6-8 hours, performing suction filtration, taking the solid phase and drying it to obtain the composite carbon source.

The mass ratio of the modified graphene oxide, deionized water, carbon-containing mixture solution, aniline, and ammonium persulfate aqueous solution is 1-2:10-20:4-6:1-1.5:2.4-3.8.

The mass fraction of ammonium persulfate in the ammonium persulfate aqueous solution is 26%.

As a further aspect of the present application, the coating agent comprises at least one of metal oxide and metal salt.

As a further aspect of the present application, the coating agent is preferably one or any combination of magnesium oxide, magnesium carbonate, titanium dioxide, vanadium pentoxide, and aluminum metaphosphate.

As a further aspect of the present application, the calcining refers to calcining at 200-1000° C. for 3-20 hours.

As a further aspect of the present application, the calcining refers to calcining at 400-800° C. for 5-15 hours.

As a further aspect of the present application, the addition amount of the carbon source is 0.5-2.5% of the mass of the cathode material, and the addition amount of the coating agent is 0.05-1% of the mass of the cathode material.

As a further aspect of the present application, the addition amount of the carbon source is 0.8-1.8% of the mass of the cathode material, and the addition amount of the coating agent is 0.1-0.8% of the mass of the cathode material.

As a further aspect of the present application, the mixing in step B1 is not particularly limited and can be a conventional dry mixing method in the field.

A cathode material prepared using the above preparation method.

A lithium battery comprising a cathode, a negative electrode, and an electrolyte, wherein the cathode comprises the above cathode material.

The beneficial effects of the present application:

The lithium manganese iron phosphate substrate, cathode material, and their preparation method and lithium battery disclosed in the present application coat the surface of the carbon-free nano lithium manganese iron phosphate substrate with metal oxide or metal salt and carbon. The coating layer formed on the surface of the composite lithium manganese iron phosphate material prevents the lithium battery from reacting with the electrolyte, while the carbon coating layer improves the electrical contact between the substrate material particles, enhancing the ion transport efficiency and electronic conductivity on the material surface, thereby increasing the material's conductivity.

Furthermore, through dry coating, the process flow is short, equipment costs are low, and it is easy for continuous automated operation. At the same time, multi-layer coating on the substrate surface not only reduces the reaction between the cathode material and the electrolyte in the lithium battery.

Furthermore, by setting a coating layer to cover the lithium manganese iron phosphate substrate, the phenomenon of manganese dissolution in the lithium manganese iron phosphate composite material is effectively improved, ensuring the structural stability and electrochemical stability of the lithium manganese iron phosphate composite material. This is beneficial for application in lithium-ion batteries, enhancing the performance of lithium-ion batteries.

Furthermore, the modified oxidized graphite, nanocellulose, and acidified carbon nanotubes form a three-dimensional network structure through in-situ polymerization, uniformly coating the outermost layer of the lithium manganese iron phosphate substrate, shortening the electron diffusion pathway, increasing the electron diffusion rate, and enhancing electronic conductivity. Among them, by processing nanocellulose and acidified carbon nanotubes, a uniformly dispersed carbon-containing mixture solution is obtained, which forms a good conductive pathway after polymerization with modified oxidized graphite, thereby improving conductivity.

BRIEF DESCRIPTION OF THE DRAWINGS

The application will be further described below in conjunction with the accompanying drawings.

DETAILED DESCRIPTION

Below, the technical solutions in the embodiments of the present application will be clearly and completely described in conjunction with the accompanying drawings in the embodiments of the present application. It is evident that the described embodiments are merely part of the embodiments of the present application, not all of them. Based on the embodiments of the present application, all other embodiments obtained by those of ordinary skill in the art without creative efforts shall fall within the scope of protection of the present application.

Example 1

Figure 2:
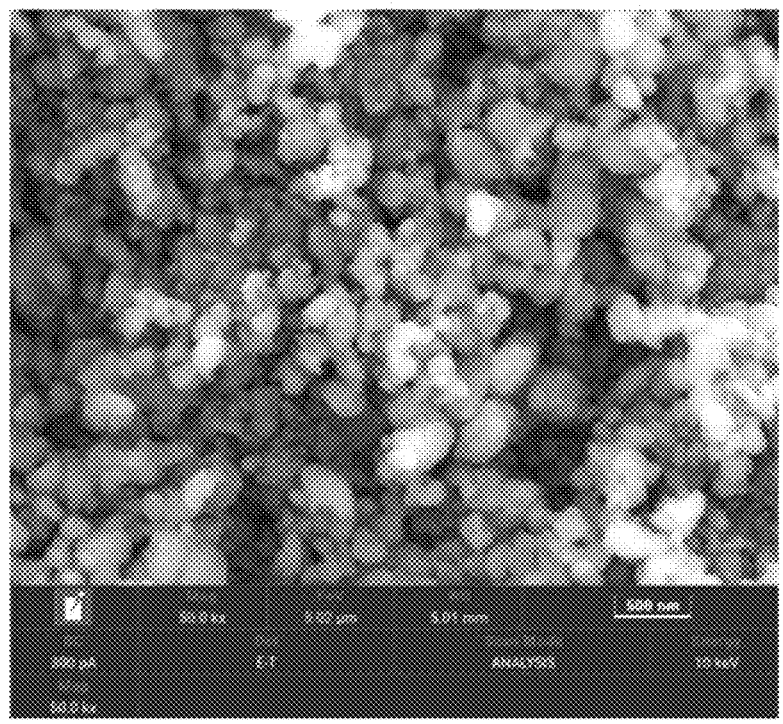
FIG. 2 is an SEM image of the cathode material prepared in Example 1 of the present application.

Preparation of a Cathode Material:

Adding lithium manganese iron phosphate substrate $LiMn_{0.6}Fe_{0.4}PO_4$ into a dry coating machine model XR-1000, then adding titanium dioxide and aluminum metaphosphate, mixing at 2000 rpm for 30 minutes, then adding polyethylene glycol and mixing again at 2000 rpm for 15 minutes. The mass ratio of polyethylene glycol, lithium manganese iron phosphate substrate, titanium dioxide, and aluminum metaphosphate is 0.15:9.845:0.003:0.002. Heat treating the mixed material at 700° C. for 8 hours under an inert gas protective atmosphere, then sieving to remove iron to obtain the lithium manganese iron phosphate composite material, as shown in FIG. 2, which is the SEM image of the cathode material prepared in Example 1.

Example 2

Preparation of a Cathode Material:

Adding lithium manganese iron phosphate substrate $LiMn_{0.6}Fe_{0.4}PO_4$ into a dry coating machine model XR-1000, then adding titanium dioxide and magnesium carbonate, mixing at 2000 rpm for 30 minutes, then adding glucose and mixing again at 2000 rpm for 15 minutes. The mass ratio of glucose, lithium manganese iron phosphate substrate, titanium dioxide, and magnesium carbonate is 0.15:9.845:0.003:0.002. Heat treating the mixed material at 700° C. for 8 hours under an inert gas protective atmosphere, then sieving to remove iron to obtain the lithium manganese iron phosphate composite material.

Example 3

Preparation of a Cathode Material:

Adding lithium manganese iron phosphate substrate $LiMn_{0.6}Fe_{0.4}PO_4$ into a dry coating machine model XR-1000, then adding magnesium oxide and vanadium pentoxide, mixing at 2000 rpm for 30 minutes, then add sucrose and mixing again at 2000 rpm for 15 minutes. The mass ratio of sucrose, lithium manganese iron phosphate substrate, magnesium oxide, and vanadium pentoxide is 0.15:9.845:0.003:0.002. Heat treating the mixed material at 700° C. for 8 hours under an inert gas protective atmosphere, then sieving to remove iron to obtain the lithium manganese iron phosphate composite material.

Example 4

Preparation of a Cathode Material:

Adding lithium manganese iron phosphate substrate $LiMn_{0.6}Fe_{0.4}PO_4$ into a dry coating machine model XR-1000, then adding titanium dioxide and vanadium pentoxide, mixing at 2000 rpm for 30 minutes, then adding polyethylene glycol and mixing again at 2000 rpm for 15 minutes. The mass ratio of polyethylene glycol, lithium manganese iron phosphate substrate, titanium dioxide, and vanadium pentoxide is 0.15:9.845:0.001:0.004. Heat treating the mixed material at 700° C. for 8 hours under an inert gas protective atmosphere, then sieving to remove iron to obtain the lithium manganese iron phosphate composite material.

Example 5

Preparation of a Cathode Material:

Adding lithium manganese iron phosphate substrate $LiMn_{0.8}Fe_{0.2}PO_4$ into a dry coating machine model XR-1000, then adding titanium dioxide and aluminum metaphosphate, mixing at 2000 rpm for 30 minutes, then adding citric acid and mixing again at 2000 rpm for 15 minutes. The mass ratio of citric acid, lithium manganese iron phosphate substrate, titanium dioxide, and aluminum metaphosphate is 0.15:9.845:0.004:0.001. Heat treating the mixed material at 800° C. for 5 hours under an inert gas protective atmosphere, then sieving to remove iron to obtain the lithium manganese iron phosphate composite material.

Example 6

Preparation of a Cathode Material:

Adding the lithium manganese iron phosphate substrate $LiMn_{0.3}Fe_{0.7}PO_4$ into a dry coating machine model XR-1000, then adding titanium dioxide and aluminum metaphosphate, mixing at 2000 rpm for 30 minutes, then adding polyethylene glycol and mixing again at 2000 rpm for 15 minutes. The mass ratio of polyethylene glycol, lithium manganese iron phosphate substrate, titanium dioxide, and aluminum metaphosphate is 0.15:9.845:0.003:0.002. Heat treating the mixed material at 400° C. for 15 hours under an inert gas protective atmosphere, then sieving to remove iron to obtain the lithium manganese iron phosphate composite material.

Example 7

The only difference between this example and Example 1 is that the carbon source is replaced with glucose and sucrose. The mass ratio of glucose, sucrose, lithium manganese iron phosphate substrate, titanium dioxide, and aluminum metaphosphate is 0.03:0.02:9.85:0.05:0.05. Other conditions and parameters are identical to Example 1.

Example 8

The only difference between this example and Example 1 is that the heat treating time is adjusted to 10 h. Other conditions and parameters are identical to Example 1.

Example 9

Preparation of a Cathode Material:

Adding the lithium manganese iron phosphate substrate $LiMn_{0.65}Fe_{0.35}PO_4$ into the dry coating machine model XR-1000, then adding titanium dioxide and aluminum metaphosphate, mixing at 2000 rpm for 30 minutes, then adding polyethylene glycol and mixing again at 2000 rpm for 15 minutes. The mass ratio of polyethylene glycol, lithium manganese iron phosphate substrate, titanium dioxide, and aluminum metaphosphate is 0.25:9.7:0.03:0.02. Heat treating the mixed material at 700° C. for 8 hours under an inert gas protective atmosphere, then sieving to remove iron to obtain the lithium manganese iron phosphate composite material.

Example 10

The only difference between this example and Example 1 is that the mixed material is heat-treated at 200° C. for 20 hours under an inert gas protective atmosphere, with all other conditions and parameters being exactly the same as in Example 1.

Example 11

The only difference between this example and Example 1 is that the mixed material is heat-treated at 1000° C. for 3 hours under an inert gas protective atmosphere, with all other conditions and parameters being exactly the same as in Example 1.

Example 12

The difference in this example compared to Example 1 is the replacement of the carbon source with a composite carbon source.

The preparation of the composite carbon source is as follows:

(1) Mixing the sulfuric acid aqueous solution and nitric acid aqueous solution, adding carbon nanotubes, performing ultrasonic dispersion, adding deionized water, conducting temperature-controlled stirring, performing suction filtration, and taking the solid phase for drying to obtain acidified carbon nanotubes.

The ratio of the sulfuric acid aqueous solution, nitric acid aqueous solution, carbon nanotube, and deionized water is 300 mL: 100 mL: 0.8 g: 500 mL.

The mass fraction of sulfuric acid in the sulfuric acid aqueous solution is 98%, and the mass fraction of nitric acid in the nitric acid aqueous solution is 95%.

The ultrasonic dispersion time is 30 minutes.

The temperature-controlled stirring refers to constant temperature magnetic stirring at 60° C. for 4 hours.

The suction filtration refers to using a 0.22 μm polytetrafluoroethylene membrane for filtration.

The drying refers to drying at 65° C. for 4 hours.

(2) Adding reed pulp and potassium permanganate to the sulfuric acid aqueous solution, stirring, performing a temperature-controlled reaction, centrifugal washing, ultrasonically crushing, separating, adding the solid phase to deionized water, stirring for 15 minutes, performing homogenization treatment 3 times at a pressure of 300 bar to obtain nanocellulose gel, and sealing at 4° C. for later use.

The ratio of the sulfuric acid aqueous solution, reed pulp, potassium permanganate, and deionized water is 50 mL: 1 g: 8 g: 200 mL; the stirring time is 1 h; the mass fraction of sulfuric acid in the sulfuric acid aqueous solution is 55%; the temperature-controlled reaction refers to a reaction at 50° C. for 2 h; the centrifugal washing refers to washing until the pH reaches 6.

(3) Mixing the acidified carbon nanotubes, nanocellulose gel, and deionized water, and performing ultrasonic dispersion in an ice-water bath to obtain a carbon-containing mixture solution.

The ratio of acidified carbon nanotubes, nanocellulose gel, and deionized water is 4 mg: 2 mL: 20 mL; the ultrasonic dispersion refers to ultrasonic treatment at 650 W amplitude for 20 min;

(4) Mixing dimethylformamide, graphene oxide, and diethylenetriamine, ultrasonically oscillate for 15 minutes, performing a temperature-controlled reaction, filtering, taking the solid phase and drying it to obtain modified graphene oxide.

The mass ratio of dimethylformamide, graphene oxide, and diethylenetriamine is 40:1.5:50.

The temperature-controlled reaction refers to stirring at 60° C. for 12 hours.

The graphene oxide is prepared using the modified Hummers method.

(5) Mixing the modified graphene oxide with deionized water, ultrasonically dispersing for 1 hour, adding the carbon-containing mixture solution, ultrasonically dispersing for 1 hour to obtain a dispersion, adjusting the pH of the dispersion to 1.0, adding aniline, stirring in an ice-water bath at 0° C. for 1 hour, adding ammonium persulfate aqueous solution, reacting at 0° C. for 8 hours, performing suction filtration, taking the solid phase and drying it to obtain the composite carbon source;

The mass ratio of the modified graphene oxide, deionized water, carbon-containing mixture solution, aniline, and ammonium persulfate aqueous solution is 1:10:4:1:2.4.

The mass fraction of ammonium persulfate in the ammonium persulfate aqueous solution is 26%.

Example 13

The difference in this example compared to Example 1 is the replacement of the carbon source with a composite carbon source.

The preparation of the composite carbon source is as follows:

(1) Mixing the sulfuric acid aqueous solution and nitric acid aqueous solution, adding carbon nanotubes, performing ultrasonic dispersion, adding deionized water, conducting temperature-controlled stirring, performing suction filtration, and taking the solid phase for drying to obtain acidified carbon nanotubes.

The ratio of the sulfuric acid aqueous solution, nitric acid aqueous solution, carbon nanotube, and deionized water is 400 mL: 120 mL: 1.0 g: 500 mL.

The mass fraction of sulfuric acid in the sulfuric acid aqueous solution is 98%, and the mass fraction of nitric acid in the nitric acid aqueous solution is 95%.

The time for ultrasonic dispersion is 35 minutes.

The temperature-controlled stirring refers to constant temperature magnetic stirring at 60° C. for 5 hours.

The suction filtration refers to using a 0.22 μm polytetrafluoroethylene membrane for filtration.

The drying refers to drying at 68° C. for 5 hours.

(2) Adding reed pulp and potassium permanganate to the sulfuric acid aqueous solution, stirring, performing a temperature-controlled reaction, centrifugal washing, ultrasonically crushing, separating, adding the solid phase to deionized water, stirring for 25 minutes, and performing homogenization treatment 4 times under 300 bar pressure to obtain nanocellulose gel, and seal it at 4° C. for later use.

The ratio of the sulfuric acid aqueous solution, reed pulp, potassium permanganate, and deionized water is 60 mL: 1.5 g: 10 g: 200 mL; the stirring time is 1.5 hours; the mass fraction of sulfuric acid in the sulfuric acid aqueous solution is 55%; the temperature-controlled reaction refers to reacting at 50° C. for 2.5 hours; the centrifugal washing refers to washing until the pH reaches 6.5;

(3) Mixing the acidified carbon nanotubes, nanocellulose gel, adding deionized water, and performing ultrasonic dispersion in an ice-water bath to obtain a carbon-containing mixture solution.

The ratio of acidified carbon nanotubes, nanocellulose gel, and deionized water is 5 mg: 4 mL: 30 mL; the ultrasonic dispersion refers to ultrasonic treatment at 680 W amplitude for 25 minutes;

(4) Mixing dimethylformamide, graphene oxide, and diethylenetriamine, performing ultrasonic oscillation for 18 minutes, conducting a temperature-controlled reaction, filtering, taking the solid phase and drying it to obtain modified graphene oxide.

The mass ratio of dimethylformamide, graphene oxide, and diethylenetriamine is 50:2:55.

The temperature-controlled reaction refers to stirring at 60° C. for 14 hours.

The graphene oxide is prepared using the modified Hummers method.

(5) Mixing the modified graphene oxide with deionized water, performing ultrasonic dispersion for 1.2 hours, adding the carbon-containing mixture solution, and performing ultrasonic dispersion for 1.5 hours to obtain a dispersion, adjusting the pH of the dispersion to 1.2, adding aniline, stirring in a 2° C. water bath for 1.5 hours, adding ammonium persulfate aqueous solution, reacting at 2° C. for 7 hours, performing suction filtration, taking the solid phase, and drying it to obtain the composite carbon source;

The mass ratio of the modified graphene oxide, deionized water, carbon-containing mixture solution, aniline, and ammonium persulfate aqueous solution is 1.5:15:5:1.2:3.1.

The mass fraction of ammonium persulfate in the ammonium persulfate aqueous solution is 26%.

Example 14

The difference in this example compared to Example 1 is the replacement of the carbon source with a composite carbon source.

The preparation of the composite carbon source is as follows:

(1) Mixing the sulfuric acid aqueous solution and nitric acid aqueous solution, adding carbon nanotubes, performing ultrasonic dispersion, adding deionized water, conducting temperature-controlled stirring, performing suction filtration, and taking the solid phase for drying to obtain acidified carbon nanotubes.

The ratio of the sulfuric acid aqueous solution, nitric acid aqueous solution, carbon nanotubes, and deionized water is 450 mL: 150 mL: 1.2 g: 500 mL.

The mass fraction of sulfuric acid in the sulfuric acid aqueous solution is 98%, and the mass fraction of nitric acid in the nitric acid aqueous solution is 95%.

The ultrasonic dispersion time is 40 minutes.

The temperature-controlled stirring refers to constant temperature magnetic stirring at 60° C. for 6 hours.

The suction filtration refers to using a 0.22 μm polytetrafluoroethylene membrane for filtration.

The drying refers to drying at 70° C. for 6 hours.

(2) Adding reed pulp and potassium permanganate to the sulfuric acid aqueous solution, stirring, performing a temperature-controlled reaction, centrifugal washing, ultrasonic crushing, separating, taking the solid phase and adding deionized water, stirring for 30 minutes, performing homogenization treatment 3 times under 300 bar pressure to obtain nanocellulose gel, and seal at 4° C. for later use.

The ratio of the sulfuric acid aqueous solution, reed pulp, potassium permanganate, and deionized water is 80 mL: 2 g: 12.8 g: 200 mL; the stirring time is 2 h; the mass fraction of sulfuric acid in the sulfuric acid aqueous solution is 55%; the temperature-controlled reaction refers to a reaction at 50° C. for 3 h; the centrifugal washing refers to washing until the pH reaches 7;

(3) Mixing the acidified carbon nanotubes, nanocellulose gel, and deionized water, and performing ultrasonic dispersion in an ice-water bath to obtain a carbon-containing mixture solution.

The ratio of acidified carbon nanotubes, nanocellulose gel, and deionized water is 7 mg: 6 mL: 40 mL; the ultrasonic dispersion refers to ultrasonic treatment at 700 W amplitude for 30 min.

(4) Mixing dimethylformamide, graphene oxide, and diethylenetriamine, ultrasonically oscillate for 20 minutes, performing a temperature-controlled reaction, filtering, taking the solid phase and drying it to obtain modified graphene oxide.

The mass ratio of dimethylformamide, graphene oxide, and diethylenetriamine is 60:3:60.

The temperature-controlled reaction refers to stirring at 60° C. for 16 hours.

The graphene oxide is prepared using the modified Hummers method.

(5) Mixing the modified graphene oxide with deionized water, ultrasonically dispersing for 1.5 hours, adding the carbon-containing mixture solution, ultrasonically dispersing for 2 hours to obtain a dispersion, adjusting the pH of the dispersion to 1.5, adding aniline, stirring in a 5° C. water bath for 2 hours, adding ammonium persulfate aqueous solution, reacting at 5° C. for 6 hours, performing suction filtration, taking the solid phase and drying it to obtain the composite carbon source;

The mass ratio of the modified graphene oxide, deionized water, carbon-containing mixture solution, aniline, and ammonium persulfate aqueous solution is 2:20:6:1.5:3.8.

The mass fraction of ammonium persulfate in the ammonium persulfate aqueous solution is 26%.

Comparative Example 1

The difference from Example 1 is that no coating agent is added, while other conditions and parameters are exactly the same as in Example 1.

Comparative Example 2

The difference from Example 1 is that no carbon source is added, while other conditions and parameters are exactly the same as in Example 1.

Comparative Example 3

Preparation of a Cathode Material:

Adding the lithium manganese iron phosphate substrate $LiMn_{0.6}Fe_{0.4}PO_4$ into a dry coating machine model XR-1000, then adding polyethylene glycol, mixing at 2000 rpm for 30 minutes, then adding titanium dioxide and aluminum metaphosphate, and mixing again at 2000 rpm for 15 minutes. The mass ratio of polyethylene glycol, lithium manganese iron phosphate substrate, titanium dioxide, and aluminum metaphosphate is 0.15:9.845:0.003:0.002. Heat treating the mixed material at 700° C. for 8 hours under an inert gas protective atmosphere, then sieving to remove iron to obtain the lithium manganese iron phosphate composite material.

Comparative Example 4

The difference from Example 12 lies in the preparation of the composite carbon source.

(1) Adding reed pulp and potassium permanganate to the sulfuric acid aqueous solution, stirring, performing a temperature-controlled reaction, centrifugal washing, ultrasonic crush, separate, taking the solid phase and adding deionized water, stirring for 15 minutes, performing homogenization treatment 3 times under 300 bar pressure to obtain nanocellulose gel, and seal at 4° C. for later use.

The ratio of the sulfuric acid aqueous solution, reed pulp, potassium permanganate, and deionized water is 50 mL: 1 g: 8 g: 200 mL; the stirring time is 1 h; the mass fraction of sulfuric acid in the sulfuric acid aqueous solution is 55%; the temperature-controlled reaction refers to a reaction at 50° C. for 2 h; the centrifugal washing refers to washing until the pH reaches 6.

(2) Mixing dimethylformamide, graphene oxide, and diethylenetriamine, performing ultrasonic oscillation for 15 minutes, conducting a temperature-controlled reaction, filtering, taking the solid phase and drying it to obtain modified graphene oxide;

The mass ratio of dimethylformamide, graphene oxide, and diethylenetriamine is 40:1.5:50.

The temperature-controlled reaction refers to stirring at 60° C. for 12 hours.

The graphene oxide is prepared using the modified Hummers method.

(3) Mixing the modified graphene oxide and deionized water, ultrasonically dispersing for 1 hour, adding the nanocellulose gel, and ultrasonically dispersing for another hour to obtain a dispersion, adjusting the pH of the dispersion to 1.0, adding aniline, and stirring in an ice-water bath at 0° C. for 1 hour. Adding the ammonium persulfate aqueous solution, conducting a temperature-controlled reaction, performing suction filtration, and drying the solid phase to obtain the composite carbon source.

The mass ratio of the modified graphene oxide, deionized water, nanocellulose gel, aniline, and ammonium persulfate aqueous solution is 1:10:4:1:2.4.

The mass fraction of ammonium persulfate in the ammonium persulfate aqueous solution is 26%.

Comparative Example 5

The difference from Example 12 lies in the preparation of the composite carbon source.

(1) Mixing the sulfuric acid aqueous solution and nitric acid aqueous solution, adding carbon nanotubes, performing ultrasonic dispersion, adding deionized water, conducting temperature-controlled stirring, performing suction filtration, and taking the solid phase for drying to obtain acidified carbon nanotubes.

The ratio of the sulfuric acid aqueous solution, nitric acid aqueous solution, carbon nanotube, and deionized water is 300 mL: 100 mL: 0.8 g: 500 mL.

The mass fraction of sulfuric acid in the sulfuric acid aqueous solution is 98%, and the mass fraction of nitric acid in the nitric acid aqueous solution is 95%.

The ultrasonic dispersion time is 30 minutes.

The temperature-controlled stirring refers to constant temperature magnetic stirring at 60° C. for 4 hours.

The suction filtration refers to using a 0.22 μm polytetrafluoroethylene membrane for filtration.

The drying refers to drying at 65° C. for 4 hours.

(2) Mixing dimethylformamide, graphene oxide, and diethylenetriamine, performing ultrasonic oscillation for 15 minutes, conducting a temperature-controlled reaction, filter, taking the solid phase and dry it to obtain modified graphene oxide;

The mass ratio of dimethylformamide, graphene oxide, and diethylenetriamine is 40:1.5:50.

The temperature-controlled reaction refers to stirring at 60° C. for 12 hours.

The graphene oxide is prepared using the modified Hummers method.

(3) Mixing the modified graphene oxide with deionized water, performing ultrasonic dispersion for 1 hour, adding the acidified carbon nanotubes, and performing ultrasonic dispersion for another hour to obtain a dispersion. Adjusting the pH of the dispersion to 1.0, adding aniline, stirring in an ice water bath at 0° C. for 1 hour, adding ammonium persulfate aqueous solution, conducting a temperature-controlled reaction, performing suction filtration, and taking the solid phase for drying to obtain the composite carbon source.

The mass ratio of the modified graphene oxide, deionized water, acidified carbon nanotubes, aniline, and ammonium persulfate aqueous solution is 1:10:4:1:2.4.

The mass fraction of ammonium persulfate in the ammonium persulfate aqueous solution is 26%.

Comparative Example 6

The difference from Example 12 lies in the preparation of the composite carbon source.

(1) Mixing the sulfuric acid aqueous solution and nitric acid aqueous solution, adding carbon nanotubes, performing ultrasonic dispersion, adding deionized water, conducting temperature-controlled stirring, performing suction filtration, and taking the solid phase for drying to obtain acidified carbon nanotubes.

The ratio of the sulfuric acid aqueous solution, nitric acid aqueous solution, carbon nanotube, and deionized water is 300 mL: 100 mL: 0.8 g: 500 mL.

The mass fraction of sulfuric acid in the sulfuric acid aqueous solution is 98%, and the mass fraction of nitric acid in the nitric acid aqueous solution is 95%.

The ultrasonic dispersion time is 30 minutes.

The temperature-controlled stirring refers to constant temperature magnetic stirring at 60° C. for 4 hours.

The suction filtration refers to using a 0.22 μm polytetrafluoroethylene membrane for filtration.

The drying refers to drying at 65° C. for 4 hours.

(2) Adding reed pulp and potassium permanganate to the sulfuric acid aqueous solution, stirring, performing a temperature-controlled reaction, centrifugal washing, ultrasonically crush, separate, adding the solid phase to deionized water, stirring for 15 minutes, performing homogenization treatment 3 times at a pressure of 300 bar to obtain nanocellulose gel, and seal at 4° C. for later use;

The ratio of the sulfuric acid aqueous solution, reed pulp, potassium permanganate, and deionized water is 50 mL: 1 g: 8 g: 200 mL; the stirring time is 1 h; the mass fraction of sulfuric acid in the sulfuric acid aqueous solution is 55%; the temperature-controlled reaction refers to a reaction at 50° C. for 2 h; the centrifugal washing refers to washing until the pH reaches 6.

(3) Mixing the acidified carbon nanotubes, nanocellulose gel, and deionized water, and performing ultrasonic dispersion in an ice-water bath to obtain a carbon-containing mixture solution; performing suction filtration, taking the solid phase and dry it to obtain the composite carbon source.

The ratio of acidified carbon nanotubes, nanocellulose gel, and deionized water is 4 mg: 2 mL: 20 mL; the ultrasonic dispersion refers to sonication at 650 W amplitude for 20 minutes.

Performance Testing:

1) Mixing the cathode materials prepared in Examples 1-14 and Comparative

Examples 1-6 with carbon black in PVDF glue solution to obtain cathode slurry. The mass ratio of cathode material, carbon black, and PVDF glue solution is 90:5:5. Coating the cathode slurry on the surface of the cathode current collector, roll pressing and drying it to prepare the cathode sheet. Assembling the cathode sheet with a graphite negative electrode sheet into a full cell for validation, and testing the cycle, rate, and specific capacity.

The cycling performance was tested at 25° C. (1C/1C 2.0-4.3V), and the specific capacity was tested at 0.1C (25° C. 2.0-4.3V). The test results are shown in Table 1:

|  | 25° C. 1C Discharge capacity per gram | 25° C. 1000-cycle capacity retention rate |
|---|---|---|
| Example 1 | 159.77 | 88.5 |
| Example 2 | 157.26 | 87.5 |
| Example 3 | 158.82 | 86.4 |
| Example 4 | 155.69 | 86.2 |
| Example 5 | 154.16 | 84.8 |
| Example 6 | 156.54 | 85.6 |
| Example 7 | 154.78 | 75.2 |
| Example 8 | 155.97 | 76.9 |
| Example 9 | 155.14 | 76.4 |
| Example 10 | 153.02 | 73.6 |
| Example 11 | 152.94 | 73.4 |
| Example 12 | 161.65 | 88.7 |
| Example 13 | 161.94 | 88.9 |

-continued

|  | 25° C. 1C Discharge capacity per gram | 25° C. 1000-cycle capacity retention rate |
|---|---|---|
| Example 14 | 161.71 | 88.6 |
| Comparative Example 1 | 147.35 | 68.5 |
| Comparative Example 2 | 145.64 | 69.5 |
| Comparative Example 3 | 146.41 | 66.8 |
| Comparative Example 4 | 151.47 | 72.8 |
| Comparative Example 5 | 151.53 | 72.7 |
| Comparative Example 6 | 150.79 | 72.6 |

Negative electrode manganese content detection: The lithium-ion battery was cycled 500 times at 25° C. (1C 2.0-4.3V), then disassembled to test the manganese content in the negative electrode material using the ICP testing method. The test results are shown in Table 2.

Manganese dissolution detection in materials: Adding 10 mL of 0.1 mol/L HCl solution and 90 mL of pure water into a beaker, adding the cathode material, stirring for 10 minutes, then let it stand for 2 hours. Filtering and taking the supernatant to test the manganese content using the ICP testing method. The test results are shown in Table 2.

Material powder resistance detection: Adding the cathode material to the sample container, placing it in the powder resistivity tester, applying pressure and maintaining stability, connecting the current clamp and voltage clamp, reading the resistivity value, reading twice in both directions and taking the average value, the test results are shown in Table 2:

|  | Material-Manganese dissolution (ppm) | Resistivity ($\Omega$-cm) | C500-Manganese content of negative electrode (ppm) |
|---|---|---|---|
| Example 1 | 3.0 | 10.1 | 111 |
| Example 2 | 5.60 | 15.6 | 125 |
| Example 3 | 3.40 | 15.5 | 156 |
| Example 4 | 6.80 | 20.6 | 238 |
| Example 5 | 5.10 | 34.5 | 268 |
| Example 6 | 10.50 | 50.5 | 257 |
| Example 7 | 13.20 | 99 | 255 |
| Example 8 | 12.60 | 112 | 269 |
| Example 9 | 10.70 | 105 | 258 |
| Example 10 | 15.40 | 121 | 278 |
| Example 11 | 15.80 | 123 | 281 |
| Example 12 | 3.10 | 10.3 | 114 |
| Example 13 | 2.90 | 9.8 | 107 |
| Example 14 | 3.20 | 10.5 | 116 |
| Comparative Example 1 | 50.50 | 850 | 1500 |
| Comparative Example 2 | 36.90 | 1020 | 1439 |
| Comparative Example 3 | 49.60 | 896 | 1566 |
| Comparative Example 4 | 6.70 | 19.8 | 235 |
| Comparative Example 5 | 6.50 | 18.3 | 228 |
| Comparative Example 6 | 13.60 | 113 | 271 |

As can be seen from Table 1-2, the cathode materials prepared in Examples 1-12 exhibit excellent cycling performance, with a significant advantage in suppressing manganese dissolution. The manganese content in the negative electrode is significantly low, indicating that the coated and modified lithium manganese iron phosphate effectively suppresses manganese dissolution in the battery while maintaining excellent electrochemical performance, suggesting that this coated and modified lithium manganese iron phosphate material is particularly suitable as a cathode material for high energy density lithium-ion batteries.

Among them:

In Comparative Example 1, the absence of a metal coating layer leads to ineffective suppression of manganese dissolution, resulting in poor cycle life and charge-discharge performance of the lithium manganese iron phosphate cathode material.

In Comparative Example 2, the absence of a carbon coating layer increases the powder resistivity, leading to reduced electronic conductivity of the material, which deteriorates the charge-discharge performance.

In Comparative Example 3, the order of the metal coating layer and carbon coating layer was swapped, causing misalignment between the carbon coating layer and the metal coating layer, which weakens the effects of both coating layers, reduces electronic conductivity, and diminishes the ability to suppress manganese dissolution.

Figure 1:
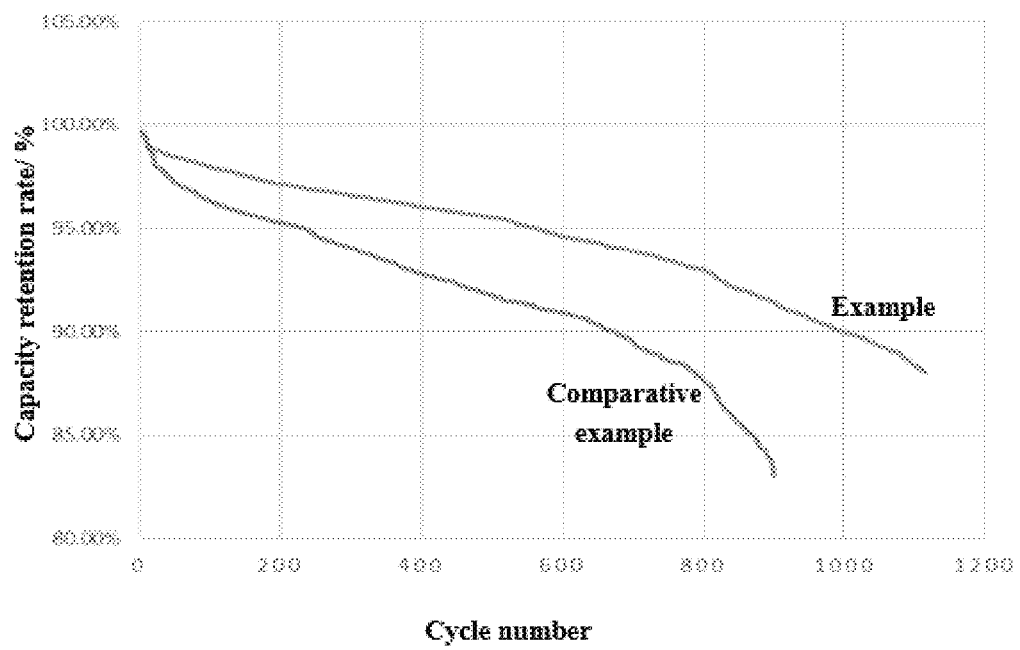
FIG. 1 is a comparison chart of the cycling performance at 25° C. between the lithium battery prepared in Example 1 of the present application and the lithium battery prepared in Comparative Example 1.

As shown in FIG. 1, the specific capacity and cycling performance at 25° C. of the lithium batteries made from the cathode materials prepared in Example 1 and Comparative Example 1 are compared. From the comparison between Example 1 and Comparative Example 1, it can be concluded that, compared to lithium batteries made from unmodified cathode materials, the cathode materials described in this application exhibit significantly improved cycling performance under normal temperature conditions of 25° C., with a capacity retention rate of 88.01% after 1116 cycles.

By coating with metal oxide or metal salt and carbon coating, the dissolution of manganese in the cathode material is effectively suppressed, thereby enhancing the structural stability of the cathode material. At the same time, the cathode material exhibits excellent electrochemical performance, which is beneficial for its application in lithium batteries. Furthermore, by setting a carbon coating layer, the conductivity of the lithium manganese iron phosphate composite material can be further improved, better meeting application requirements.

Based on Example 12, the electrochemical performance of the cathode material prepared in Proportions 4-6 decreased due to the lack of synergistic effects among modified graphene oxide, nanocellulose, and acidified carbon nanotubes. This is because the synergistic effect of modified graphene oxide, nanocellulose, and acidified carbon nanotubes forms a composite carbon source with excellent conductivity, which uniformly coats the outermost layer of the lithium manganese iron phosphate substrate, shortening the electron diffusion pathway, increasing the electron diffusion rate, and improving electronic conductivity.

The above detailed description of some embodiments of the present application is provided, but the content is merely the preferred embodiments of the present application and should not be considered as limiting the scope of the present application. Any equivalent changes and modifications made according to the scope of the claims of the present application should still fall within the patent coverage of the present application.

What is claimed is:

1. A preparation method of a cathode material, characterized in that the preparation of the cathode material comprises the following steps:

B1. placing lithium manganese iron phosphate substrate in a dry coating machine, adding coating agent and mixing, then adding carbon source and mixing to obtain mixture C;

B2. calcining the mixture C in a protective atmosphere, crushing it to obtain the cathode material;

the coating agent comprises at least one of metal oxide and metal salt, the carbon source comprises a composite carbon source;

the preparation of the composite carbon source comprises the following steps:

(1) mixing sulfuric acid aqueous solution and nitric acid aqueous solution, adding carbon nanotubes, performing ultrasonic dispersion, adding deionized water, conducting temperature-controlled stirring, performing suction filtration, taking solid phase and dry it to obtain acidified carbon nanotubes;

wherein the dosage ratio of the sulfuric acid aqueous solution, the nitric acid aqueous solution, the carbon nanotube, and the deionized water is 300-450 mL: 100-150 mL: 0.8-1.2 g: 500 mL;

(2) adding reed pulp and potassium permanganate to the sulfuric acid aqueous solution, stirring, performing a temperature-controlled reaction, centrifugal washing, ultrasonically crushing, separating, taking solid phase to add into deionized water, stirring for 15-30 minutes, and performing homogenization treatment 3-4 times under 300 bar pressure to obtain nanocellulose gel, which is sealed and stored at 4° C. for later use;

wherein the dosage ratio of the sulfuric acid aqueous solution, the reed pulp, the potassium permanganate, and the deionized water is 50-80 mL: 1-2 g: 8-12.8 g: 200 mL; the temperature-controlled reaction refers to a reaction at 50° C. for 2-3 hours;

(3) mixing the acidified carbon nanotubes, the nanocellulose gel, and the deionized water, and performing ultrasonic dispersion in an ice-water bath to obtain a carbon-containing mixture solution;

wherein the dosage ratio of the acidified carbon nanotubes, the nanocellulose gel, and the deionized water is 4-7 mg: 2-6 mL: 20-40 mL; the ultrasonic dispersion refers to sonication at an amplitude of 650-700 W for 20-30 minutes;

(4) mixing dimethylformamide, graphene oxide, and diethylenetriamine, performing ultrasonic oscillation for 15-20 minutes, conducting a temperature-controlled reaction, filtering, and drying the solid phase to obtain modified graphene oxide;

wherein the mass ratio of the dimethylformamide, the graphene oxide, and the diethylenetriamine is 40-60: 1.5-3:50-60;

the temperature-controlled reaction refers to stirring at 60° C. for 12-16 hours;

(5) taking the modified graphene oxide and deionized water, mixing and ultrasonically dispersing for 1-1.5 hours, adding the carbon-containing mixture solution, and ultrasonically dispersing for 1-2 hours to obtain a dispersion, adjusting the pH of the dispersion to 1.0-1.5, adding aniline, stirring in a 0-5° C. water bath for 1-2 hours, adding ammonium persulfate aqueous solution, reacting at 0-5° C. for 6-8 hours, performing suction filtration, taking the solid phase and drying it to obtain the composite carbon source;

wherein the mass ratio of the modified graphene oxide, the deionized water, the carbon-containing mixture solution, the aniline, and the ammonium persulfate aqueous solution is 1-2:10-20:4-6:1-1.5:2.4-3.8.

2. The preparation method of a cathode material according to claim 1, characterized in that the calcining refers to calcining at 200-1000° C. for 3-20 hours.

3. The preparation method of a cathode material according to claim 1, characterized in that the addition amount of the carbon source is 0.5-2.5% of the mass of the cathode material, and the addition amount of the coating agent is 0.05-1% of the mass of the cathode material.

4. The preparation method of a cathode material according to claim 1, characterized in that the preparation of the lithium manganese iron phosphate substrate comprises the following steps:

A1. dissolving soluble ferrous salt, soluble manganese salt, phosphoric acid, and lithium hydroxide in deionized water to react and obtain Material A;

A2. filtering the Material A, taking filter cake and drying it to obtain Material B;

A3. heat treating the Material B in an inert gas atmosphere to obtain the lithium manganese iron phosphate substrate.

5. The preparation method of a cathode material according to claim 4, characterized in that the heating treating in step A3 refers to calcining at 200-500° C. for 3-8 hours.

6. The preparation method of a cathode material according to claim 4, characterized in that the chemical formula of the lithium manganese iron phosphate substrate is $LiMn_xFe_{1-x}PO_4$, $0.3 \leq x < 0.9$.

7. A cathode material prepared by the preparation method according to claim 1.

8. A lithium battery, comprising a positive electrode, a negative electrode, and an electrolyte, characterized in that the positive electrode comprises the cathode material according to claim 7.

* * * * *